United States Patent [19]
Martin et al.

[11] 4,209,274
[45] Jun. 24, 1980

[54] PORTABLE POWER DRIVE

[75] Inventors: Richard J. Martin, Lorain County; Richard J. Mittendorf, Erie County, both of Ohio

[73] Assignee: Emerson Electric Co., St. Louis, Mo.

[21] Appl. No.: 923,796

[22] Filed: Jul. 12, 1978

[51] Int. Cl.² .................... B23G 1/24; B23G 1/52
[52] U.S. Cl. .................... 408/126; 10/89 P; 10/107 PH
[58] Field of Search .......... 10/89 R, 89 P, 87, 107 R, 10/107 PH; 279/114; 408/126

[56] References Cited

U.S. PATENT DOCUMENTS

| | | | |
|---|---|---|---|
| 1,344,280 | 6/1920 | Vosper | 10/89 R |
| 1,749,861 | 3/1930 | Vosper | 10/89 R |
| 2,673,742 | 3/1954 | Vermette | 279/114 |
| 2,887,886 | 5/1959 | Chasar et al. | 10/89 P |
| 2,996,737 | 8/1961 | Bjalme | 10/107 R |
| 3,012,792 | 12/1961 | Bjalme | 279/114 |

FOREIGN PATENT DOCUMENTS 546709  4/1956  Belgium .................. 10/89 P

Primary Examiner—Ervin M. Combs
Attorney, Agent, or Firm—Polster, Polster and Lucchesi

[57] ABSTRACT

A lightweight power drive for threading pipe and the like includes an integral folding tripod stand. A motor casing is built into one leg of the stand, and the casing includes integral sockets in which the other two legs are hinged.

11 Claims, 5 Drawing Figures

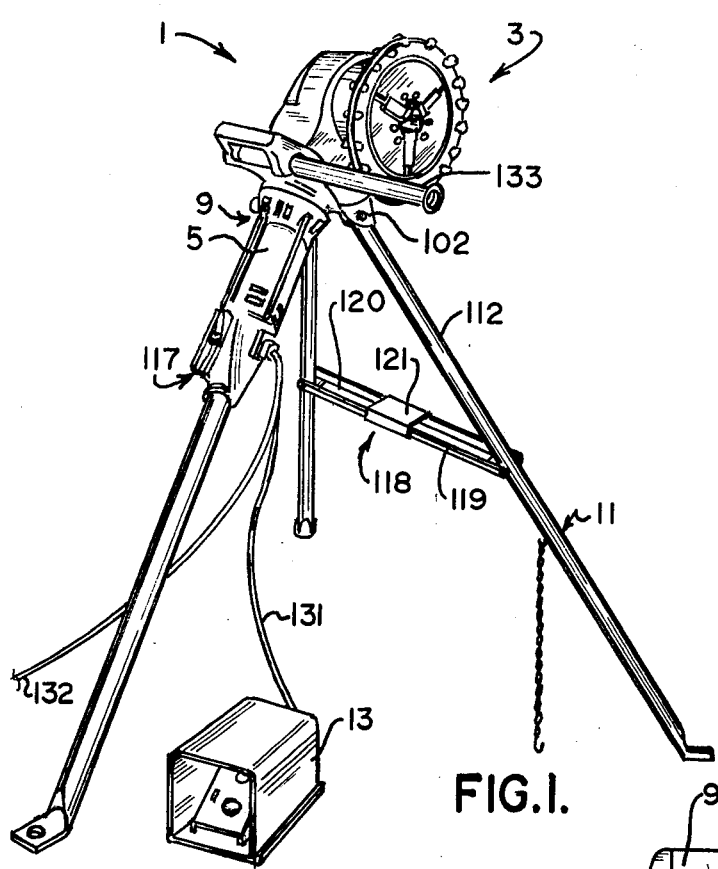
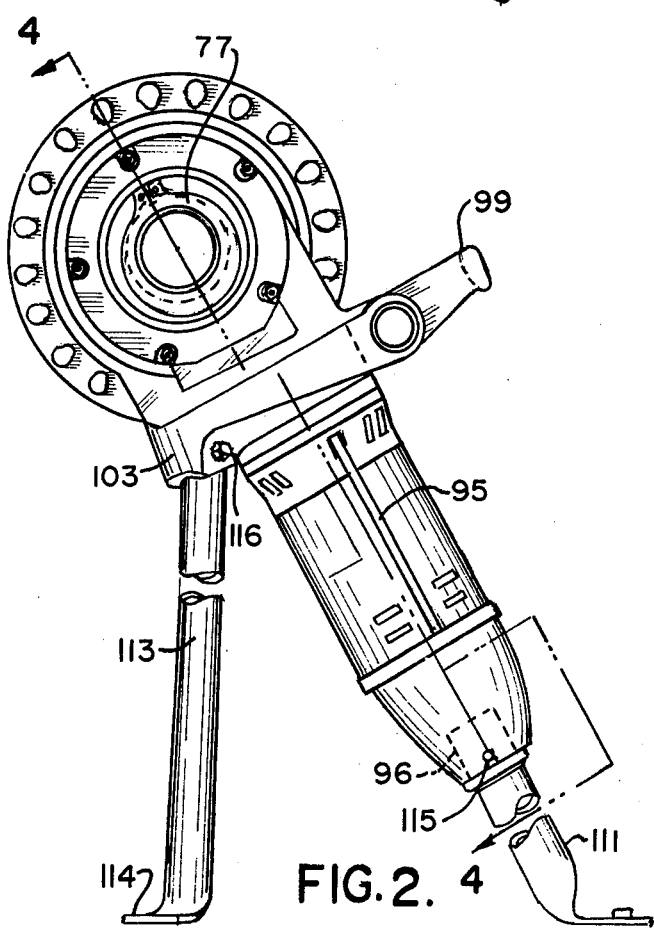
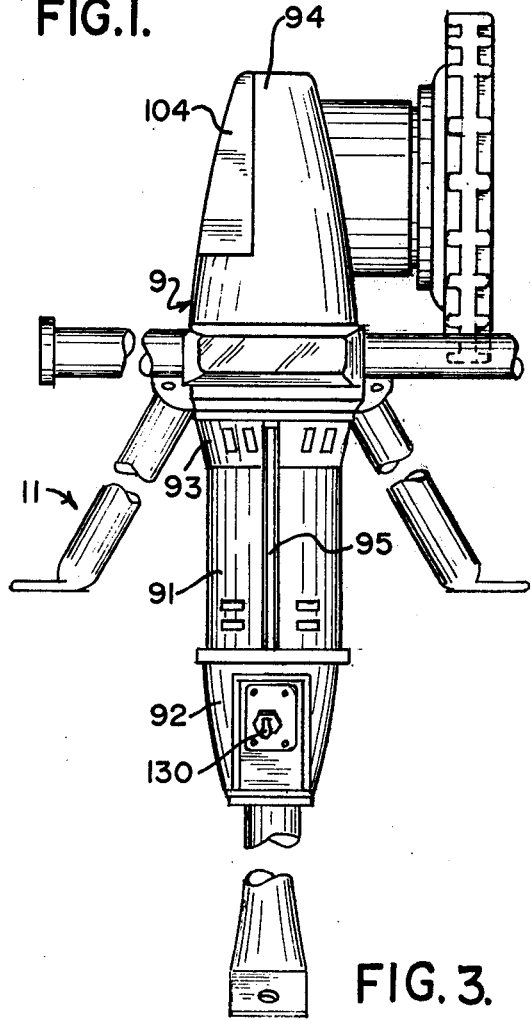
FIG. 1.
FIG. 2.
FIG. 3.

PORTABLE POWER DRIVE

BACKGROUND OF THE INVENTION

This invention relates to power drives, and in particular to an improved lightweight portable power drive.

Power drives are in wide use in the plumbing trade. These devices consist essentially of a power source such as an electric motor, a rotatable member, gearing for connecting the power source to the rotatable member, and a casing. One or two torque arms are frequently included for supporting tools used with the drive. An example of a commercially available power drive is sold by The Ridge Tool Co., Elyria, Ohio, as its Model No. 300 Power Drive, and is described in Operator's Manual No 300-M-677 (940-600-015), hereby incorporated.

Generally, the rotable member is a chuck. A length of pipe held in the chuck is supported and rotated by the drive while the pipe is worked on, for example, by a hand-held pipe cutter, reaming tool, or die head. The chuck or other rotatable member may also be used as a power source for other devices, such as geared pipe threaders.

A power drive of this type is generally mounted on a stand of some sort. A commercially available tripod stand sold by The Ridge Tool Company, as its Model No. 1206, includes a mounting plate carried on a foldable tripod. Mounting pads on the base of the power drive allow the drive to be bolted onto the tripod to produce a solid, convenient unit.

Presently known power drives of this type are too heavy for easy portability and too expensive for small plumbing shops and individual users.

Lightweight portable power drives are also known. They are used for most of the same purposes as the previously described drives. A commercially available portable power drive is sold by The Ridge Tool Company as its Model No. 700 Portable Power Drive, and is described in Operator's Manual No. 700-PD-569-R5 (940-707-010), hereby incorporated. These drives, however, are strictly hand-held devices. They are less convenient to use, and they lack many of the features of the larger stand-mounted drives. They do not hold a length of pipe as do the larger stand-mounted drives, but connect to and rotate the die head while the pipe is secured by some other means such as a pipe vise.

SUMMARY OF THE INVENTION

One of the objects of this invention is to provide a portable power drive which is lightweight and easy to transport, yet is steady, rugged and convenient in operation.

Another object is to provide such a power drive which will hold a length of pipe and which allows the pipe to be threaded by conveniently-held tools.

Another object is to provide such a power drive which is easily controlled and used by a single operator.

Other objects will occur to those skilled in the art in light of the following description and accompanying drawings.

In accordance with one aspect of this invention, generally stated, a portable power drive is provided which includes a motor, a rotatable member, gearing for connecting the motor to the portable member, a housing surrounding the motor and three legs forming a tripod support for the power drive, characterized in that the housing forms at least a part of one of the legs. This arrangement is highly compact and allows a considerable weight reduction. It also lowers the center of gravity of the device and increases its stability.

In the preferred embodiment, the motor housing is part of a casing for the motor, gearing and rotatable member. The motor housing is preferably generally cylindrical and is secured at its upper end to a casting surrounding the gearing. The lower end of the casing carries a leg extension which is generally parallel to the axis of the cylindrical housing, and is preferably coaxial with the housing. The other two legs are hinged to the casing above the motor. The casting preferably includes an integral handle and a pair of integral sockets in which the two folding legs are pivotably mounted. The pivot axes of the two folding legs are chosen to cause the legs to fold toward and parallel to the third leg, hence to each other. A knock-down brace between the two folding legs locks the legs in their open position. The casting also houses a torque arm, a spindle, and a chuck mounted to the spindle. A reversing switch is built into the casing to control the directional rotation of the chuck, and a foot switch is provided for on/off switching of the motor.

BRIEF DESCRIPTION OF THE DRAWINGS

FIG. 1 is a view in perspective of a power drive device embodying the present invention.

FIG. 2 is a view in side elevation thereof.

FIG. 3 is a view in front elevation thereof.

DESCRIPTION OF THE PREFERRED EMBODIMENT

Figures 4, 5:
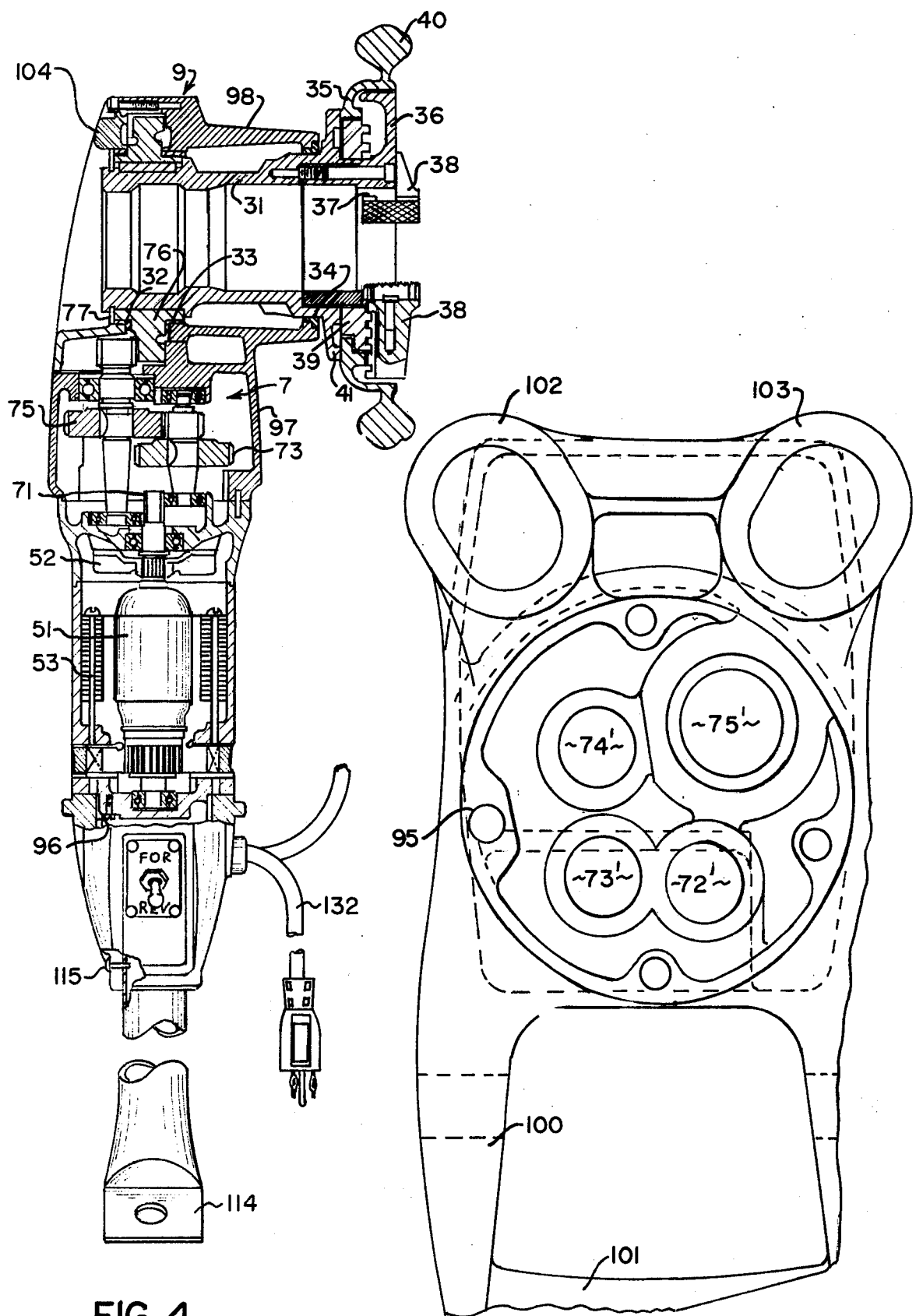
FIG. 4 is a sectional view taken along line 4—4 of FIG. 2.
FIG. 5 is a bottom plan view of a gear case of the power drive of FIGS. 1–4.

Referring now to the drawings, reference numeral 1 indicates one illustrative embodiment of power drive of the present invention. The drive 1 includes a chuck assembly indicated generally at 3, an electric motor indicated at 5, gearing 7 connecting the electric motor to the chuck assembly, a casing 9, support means 11, and a foot switch 13.

The chuck assembly 3 includes a rotatable spindle 31, supported by three bearings 32, 33 and 34. One end of the spindle 31 carries a chuck 35 which is in most respects similar to the quick acting chuck of the previously mentioned Model 300 power drive. Similar chucks are described also in U.S. Pat. No. 2,693,966 to Chaser and in U.S. Pat. Nos. 2,745,670 and 2,891,799 to Janik. Briefly, this chuck includes a chuck cap 36 having radial ways 37 in which are slidably mounted spring-loaded chuck jaws 38. The jaws are identical with those described in U.S. Pat. Nos. 2,778,652, to Ingwer et al. The rear faces of the jaws 38 are slotted to engage a scroll plate 39 carried by a hand wheel 40. The cap is bolted to a flange 41 on the end of spindle 31. The chuck scroll and hand wheel are trapped beween the cap 36 and flange 41 and are permitted limited rotational movement for moving the jaws 38 radially inwardly and outwardly in the ways 37. A pressure ring and driving wedges utilized in the Model 300 chuck are omitted in the chuck of the present invention. Their function of tightening the jaws when power is applied to the spindle 31 is performed, in the present chuck, solely by the rotatable inserts in the jaws.

The electric motor 5 is a one-half horsepower universal motor and is identical with the motor of the previously mentioned Model 700 power drive. It includes an armature 51, a fan 52 carried on the armature, and a stator 53.

The gearing 7 includes a spur gear 71 carried by the armature 51, and four intermediate gear assemblies or pairs of spur gears, 72, 73, 74 and 75. In FIG. 4, the first and third intermediate gear assemblies 72 and 74 are hidden behind the second and fourth intermediate gear assemblies 73 and 75 respectively. This gearing is all identical with the gearing of the previously mentioned Model 700 power drive. A face gear 76 is secured axially to the spindle 31 by a retaining ring 77 and is secured against rotation by a key 78. The face gear 76 is driven by the fourth intermediate gear assembly 75. As shown in FIG. 4, the face gear 76 is journaled in the bearings 32 and 33.

The casing 9 includes four aluminum castings: a generally cylindrical motor housing 91 surrounding the stator 53, a switch housing 92 mounted on the axially lower end of the motor housing 91, a generally frustoconical fan housing 93 mounted on the axially upper end of the motor housing 91, and a gear case 94 mounted on the axially upper end of the fan housing 93. The four parts of the casing are held together by through bolts 95.

The motor housing 91 is identical with the motor housing of the previously mentioned Model 700 portable power drive. The switch housing 92 is similar to the switch housing of the Model 700 power drive, but includes a socket 96 at its lower end, rather than a handle. The fan housing 93 is similar to the fan housing of the Model 700 power drive, and includes at its upper end a central opening which holds a bearing for supporting the axially extending armature shaft between the fan 52 and the gear 71, and also includes at its upper end four bosses which hold bearings for the lower ends of the intermediate gear assemblies.

The gear case 94 includes a lower, generally cylindrical, part 97 and an upper, generally cylindrical part 98. The lower part 97 is generally coaxial with the other casing parts 91, 92 and 93. The lower part 97 includes at its lower end four tapped holes 95' for the bolts 95 and includes at its upper end a central opening 75' which holds a bearing for supporting the fourth intermediate gear assembly 75, and also includes at its upper end three bosses 72', 73' and 74' which hold bearings for the upper ends of the other intermediate gear assemblies 72, 73 and 74, respectively. At the upper end of the lower part 97, the gear case includes on one side a handle 99 including a pair of arms 100 and a cross-piece 101. On the opposing side of the upper end of the lower part 97, the gear case includes a pair of socket bosses 102 and 103. The socket bosses 102 and 103 are arranged symmetrically with respect to the handle 99. As viewed along the axis of the motor housing 91 (see FIG. 5), the side walls of the socket bosses 102 and 103 are directed toward the axis of the motor housing 91 at an angle of sixty degrees with respect to each other. As viewed in side elevation (see FIG. 2), the outer end walls of the socket bosses are angled thirty-three degrees with respect to the axis of the cylindrical lower part 97. The inner end walls of the socket bosses are substantially shorter than the outer end walls to permit the legs to fold inwardly.

The upper part 98 of the gear case 94 has a generally horizontal axis, perpendicular to the axis of the lower part 97 and offset slightly from it. At an end of the upper part 98 spaced from the lower part 97, the upper part 98 carries bearing 34 for the spindle 31. At an end of the upper part 98 adjacent the lower part 97, the upper part 98 carries bearing 33 for the spindle 31. Bolted to this same end of the upper part 98 is a cover 104 which carries bearing 32 for the spindle 31. As will be seen from FIG. 4, the bearings 32, 33 and 34 also act as thrust bearings for the spindle 31.

The support means 11 include three legs 111, 112 and 113. Each leg is made of tubular steel and includes an outwardly turned foot 114 at its lower end. The first leg 111 is held rigidly in the socket at the lower end of the switch housing 92 by a pair of rivets 115. The second and third legs 112 and 113 are of smaller diameter than the first leg 111 and are pivotally held in the socket bosses 102 and 103 respectively by bolts 116. The first leg is twenty-six inches long and the second and third legs are each thirty-nine inches long. The length of the second and third legs is substantially equal to the length of the first leg plus the combined axial length of the switch housing 92, the motor housing 91, and the fan housing 93. It will be seen that the legs 112 and 113 form a stable and rigid tripod stand with a leg member 117 consisting of the combined first leg plus the switch housing 92, the motor housing 91, and the fan housing 93. The second and third legs 112 and 113 may be pivoted around the bolts 116 toward the first leg means 117 to fold the tripod stand. When folded, the second and third legs 112 and 113 are substantially parallel with the first leg 111 and are spaced about four inches on center from each other. A brace 118 prevents unwanted folding of the second and third legs 112 and 113. The brace 118 consists of a pair of channels 119 and 120 hinged to each other and to the legs 112 and 113, and a section of channel 121 welded to the upper side of one of the channels 119 to lock the brace in its horizontal position. When the brace 118 is moved to its horizontal position, it prevents accidental folding of the legs 112 and 113. A chain 122 is slipped around the first leg 111 and clipped to rings 123 and 124 on the legs 112 and 113 when the legs 112 and 113 are folded, to prevent them from opening accidentally.

A switch 130 on the switch housing 92 is provided with forward/off/reverse positions to control the direction of rotation of the chuck 3 of the power drive 1. The foot pedal 13 controls the on/off switching of the motor through electrical cord 131. The usual power cord 132 is also provided.

A support bar 133 is provided through openings in the handle arms 100, and serves many of the same functions as the support bars of the previously mentioned Model 300 power drive.

The operation of the power drive described is in most respects identical with the operation of the Model 300 power drive and will be apparent from the foregoing description. The drive is, however, light in weight and is easily folded and carried by the handle 99.

Numerous variations in the power drive of the present invention, within the scope of the appended claims, will occur to those skilled in the art in light of the foregoing disclosure. Merely by way of example, the chuck assembly could be quite different. The casing could be made from different castings. The geometry and appearance of the drive could be altered. These variations are merely illustrative.

We claim:

1. A portable power drive including a motor; a rotatable member; gearing for connecting the motor to the rotatable member; and three leg members forming a tripod support for the power drive, characterized in that said motor forms a structural part of one said leg member.

2. The drive of claim 1 wherein said motor includes a motor housing, said motor housing forming a part of a casing for said motor, for said gearing and for said rotatable member, and wherein said other two leg members are hinged to the casing above said motor.

3. The drive of claim 1 wherein said motor includes an output shaft rotatable about an axis of rotation and wherein said rotatable member is rotatable about an axis of rotation generally perpendicular to the axis of said output shaft, said one leg being generally aligned with said output shaft.

4. The drive of claim 3 wherein said one leg is substantially coaxial with said output shaft.

5. The drive of claim 3 wherein said rotatable member includes a spindle and a chuck mounted to said spindle.

6. A portable power drive including a motor having an output shaft rotatable about an axis of rotation; a rotatable member rotatable about an axis of rotation generally perpendicular to said axis of said output shaft; gearing for connecting said motor to said rotatable member; an elongate motor housing surrounding said motor, said motor housing having a long axis generally coaxial with said axis of rotation of said motor and having upper and lower axial ends; a casing surrounding said rotatable member, said axially upper end of said elongate motor housing being attached to said casing; and three legs forming a tripod support for said power drive, one of said legs being attached to said axially lower end of said elongate motor housing, and said other two legs being pivotably mounted to said casing.

7. The drive of claim 6 wherein said motor housing includes three generally coaxial pieces; a lower switch housing part, a motor housing part and an upper fan housing part.

8. The drive of claim 7 wherein said switch housing part, said motor housing part and said fan housing part are all held to each other and to said casing by through bolts.

9. The drive of claim 6 wherein said casing includes a pair of integral sockets, said other two legs being mounted in said sockets.

10. The drive of claim 6 wherein said rotatable member includes a spindle and a chuck mounted to said spindle.

11. The drive of claim 10 wherein said casing includes an integral handle and wherein said casing carries a torque arm.

* * * * *

UNITED STATES PATENT AND TRADEMARK OFFICE
CERTIFICATE OF CORRECTION

PATENT NO. : 4,209,274

DATED : June 24, 1980

INVENTOR(S) : Richard J. Martin et al

It is certified that error appears in the above-identified patent and that said Letters Patent are hereby corrected as shown below:

Column 1, line 64, "portable" should be "rotatable".

Signed and Sealed this

Tenth Day of February 1981

[SEAL]

Attest:

RENE D. TEGTMEYER

Attesting Officer

Acting Commissioner of Patents and Trademarks